United States Patent [19]

Brady, Jr.

[11] Patent Number: 4,482,518

[45] Date of Patent: Nov. 13, 1984

[54] METHODS FOR REDUCING POST-MOLD SHRINKAGE OF HOLLOW ORIENTED POLYETHYLENE TEREPHTHALATE CONTAINERS

[75] Inventor: Thomas E. Brady, Jr., Sylvania, Ohio

[73] Assignee: Owens-Illinois, Inc., Toledo, Ohio

[21] Appl. No.: 465,147

[22] Filed: Feb. 9, 1983

Related U.S. Application Data

[63] Continuation of Ser. No. 307,824, Oct. 2, 1981, abandoned.

[51] Int. Cl.³ .................... B29C 17/07; B29C 25/00
[52] U.S. Cl. .................... 264/535; 264/523; 264/532; 264/230; 264/235; 264/346
[58] Field of Search .............. 264/520, 521, 523, 535, 264/537, 538, 539, 540, 541, 542, 543, 230, 235, 346, 532

[56] References Cited

U.S. PATENT DOCUMENTS

| | | | |
|---|---|---|---|
| 3,317,642 | 5/1967 | Bailey | 264/230 |
| 3,716,606 | 2/1973 | Bazett | 264/235 X |
| 3,849,530 | 11/1974 | Wyeth et al. | 264/235 X |
| 4,260,567 | 4/1981 | Poppe et al. | 264/235 X |
| 4,264,558 | 4/1981 | Jacobsen | 264/235 X |
| 4,385,089 | 5/1983 | Bonnebat et al. | 264/537 X |

FOREIGN PATENT DOCUMENTS 54-137060 10/1979 Japan .................... 264/523

Primary Examiner—Jan Silbaugh
Attorney, Agent, or Firm—Thomas L. Farquer; M. E. Click

[57] ABSTRACT

A method is disclosed for reducing post-molding shrinkage of a hollow oriented polyethylene terephthalate container; the method including the steps of:
(1) bringing a polyethylene terephthalate parison to orientation temperature,
(2) blow molding the parison to provide a biaxially oriented container with larger dimensions than desired in the final container,
(3) heating the blow molded container for a time and temperature sufficient to shrink the container to the desired size whereby substantially all the time-temperature dependent shrinkage is accomplished.

5 Claims, 3 Drawing Figures

METHODS FOR REDUCING POST-MOLD SHRINKAGE OF HOLLOW ORIENTED POLYETHYLENE TEREPHTHALATE CONTAINERS

This is a continuation of application Ser. No. 307,824, filed Oct. 2, 1981, and now abandoned.

The present invention is directed to methods for reducing post-mold shrinkage of hollow oriented containers of polyethylene terephthalate, such as biaxially oriented polyethylene terephthalate bottles for carbonated beverages.

As is known in the art, for instance, U.S. Pat. No. 4,172,873, the shrinkage of post-mold polyethylene terephthalate (PET) containers that have been biaxially oriented is an exponential function both time and temperature.

This prior art is aware also that the shrinkage of biaxially oriented polyethylene terephthalate containers is due to the action of "frozen-in" orientation stresses. The ordinary skill of those in the art is such that it is known to heat the polyethylene terephthalate containers to high temperatures while restraining the PET containers and letting crystallization stabilize the article against shrinkage.

It is an object of the present invention to provide a method for reducing post-molding shrinkage of a hollow oriented polyethylene terephthalate container; the method providing the steps of:
(1) bringing a polyethylene terephthalate parison to orientation temperature,
(2) blow molding the parison to provide a biaxially oriented container with larger dimensions than desired in the final container,
(3) heating the blow molded container for a time and temperature sufficient to shrink the container to the desired size whereby substantially all the time-temperature dependent shrinkage is accomplished.

It is an object of the present invention to provide a method for reducing post-molding shrinkage of a hollow oriented polyethylene terephthalate container; the method providing the steps of:
(1) making a parison of polyethylene terephthalate and bringing the parison to orientation temperature,
(2) blow molding the parison to provide a biaxially oriented container with larger dimensions than desired in the final container,
(3) heating the blow molded container for a time and temperature sufficient to shrink the container to the desired size whereby substantially all the time-temperature dependent shrinkage is accomplished.

It is an object of the present invention to provide a method of reducing post-mold shrinkage of oriented polyethylene terephthalate containers by heating the molded container to about 140° F. to 170° F. for about 10 minutes to 1 second to shrink the container at least about 95% of the total time-temperature dependent shrinkage which will occur at a temperature of about 70° F. to 170° F. for a time up to about 100,000 hours without substantial distortion of the container, the lower temperature requiring the longer time and the higher temperature requiring the shorter time.

These and other objectives will be apparent in the specification and claims that follow.

The present invention provides methods for reducing the post-molding shrinkage of hollow oriented polyethylene terephthalate containers such as carbonated beverage bottles by blow molding the containers to a size larger than desired so that the main shrinkage can take place very quickly so that little additional shrinkage will occur after this treatment, even for extended storage. The above shrinkage takes place immediately without objectionable distortion as is often encountered in the prior art method of heating the PET containers to high temperature and restraining the same while letting ensuing crystallization stabilize the article against post shrinkage.

The present invention provides a method for reducing post-molding shrinkage of a hollow oriented polyethylene terephthalate container; the method providing the steps of:
(1) making a parison of polyethylene terephthalate and bringing the parison to orientation temperature,
(2) blow molding the parison to provide a container with larger dimensions than desired in the final container, and
(3) heating the blow molded container for a time and temperature sufficient to shrink the container to the desired size whereby substantially all the time-temperature dependent shrinkage is accomplished.

The above method may be effectively accomplished at a preferred temperature of 150° F. for about three minutes. Also, the post-mold shrinkage can be reduced effectively by heating the final blow molded container to about 170° F. for six seconds.

In general, the heating step may be conducted so that the container is shrunk at least about 95% of the total time-temperature dependent shrinkage which will normally occur at temperatures of about 70° F. to 170° F. for times as short as 1 second up to times of about 100,000 hours.

Novel methods of the present invention provide several Advantages, including treatment of the final bottle with no restraint and also the advantage that the post-treatment process can be easily performed by various methods of making the bottles. The novel methods are the result of recognizing that oriented polyethylene terephthalate bottles shrink as an exponential function of time, and that shrinkage can be represented as a common time-temperature super position function. Rather than stabilize the oriented article against all shrinkage as attempted in the past, the article is intentionally produced larger than desired and then exposed to a controlled temperature for a controlled time to induce a controlled amount of shrinkage, say generally about 95% and preferably at least about 98% of the total expected subsequent time-temperature dependent shrinkage expected under normal use conditions. By inducing sufficient controlled shrinkage to the bottle, only an insignificant amount of additional shrinkage will occur even after extended storage time under normal use conditions.

The effects of blowing conditions and exposure (shipping and storage) temperature on post mold shrinkage is shown in the figures, in which.

F. for 3 minutes and after exposure to infrared heat at 170° F. for 7 seconds, against a control where there is no thermal treatment.

Figure 1:
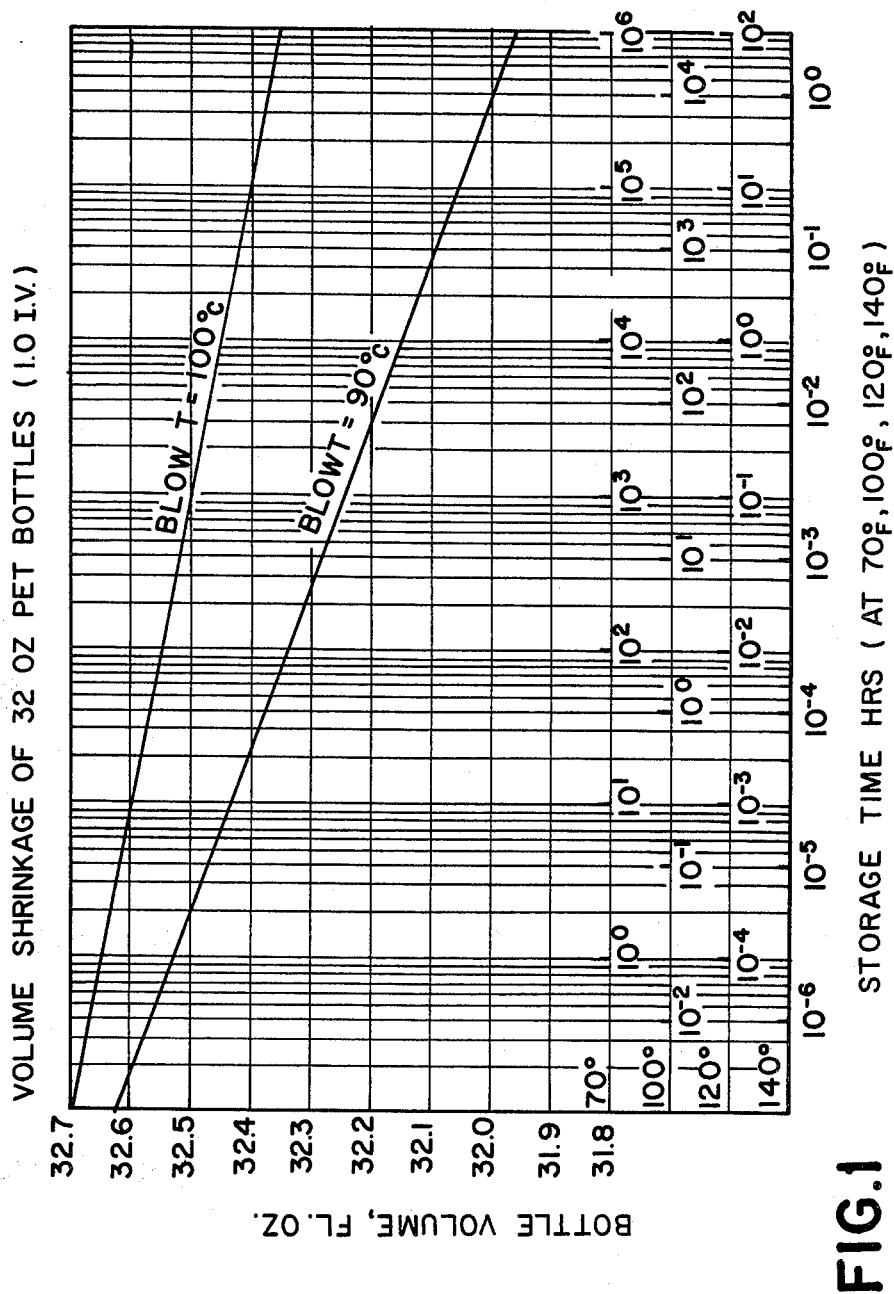
FIG. 1 shows the effects of blow temperatures on shrinkage at various subsequent exposure temperatures varying from 100° F. to 140° F.
Figure 2:
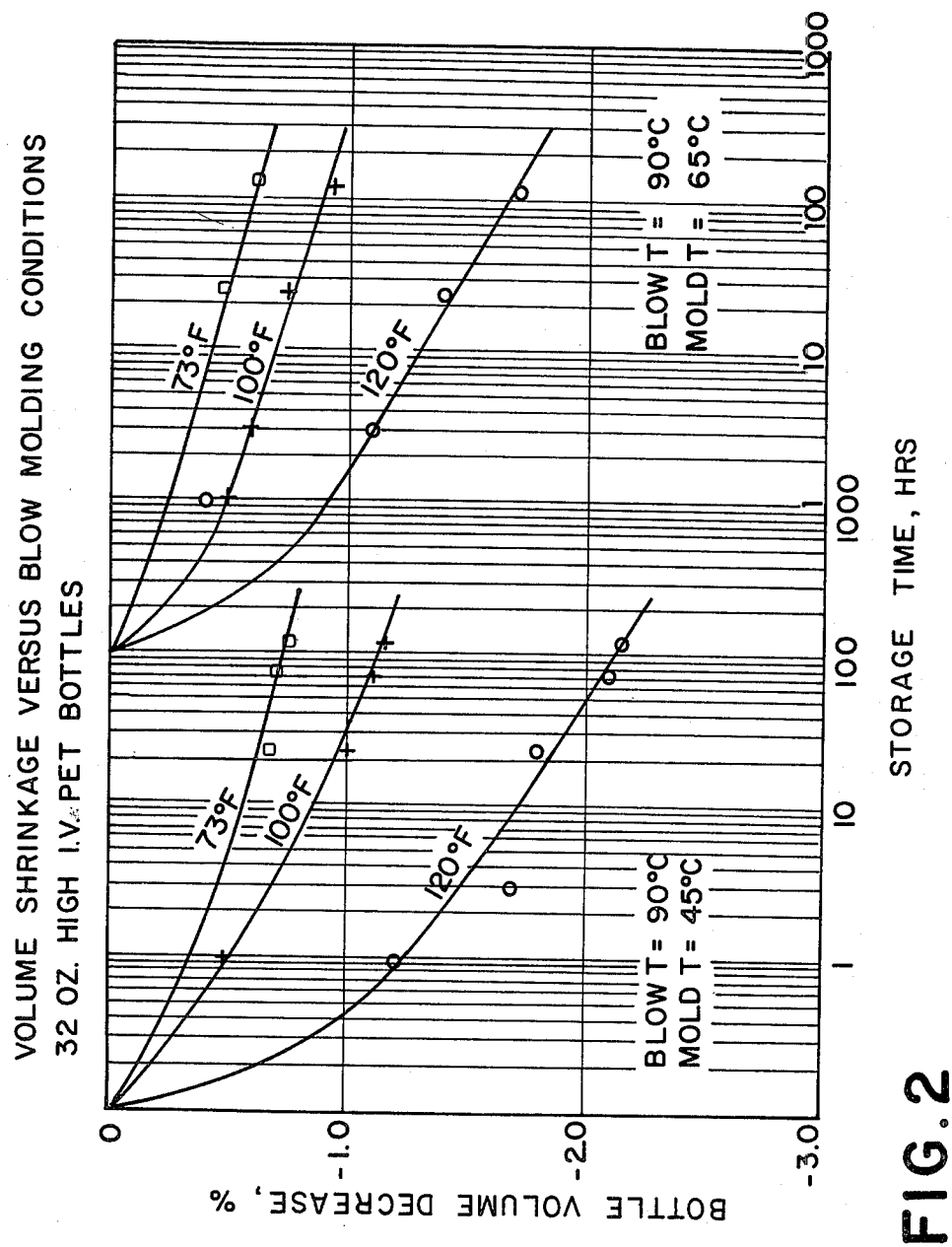
FIG. 2 shows the actual time-temperature shrinkage behavior generated at 70° F., 100° F., and 120° F. for various blow molding conditions.
Figure 3:
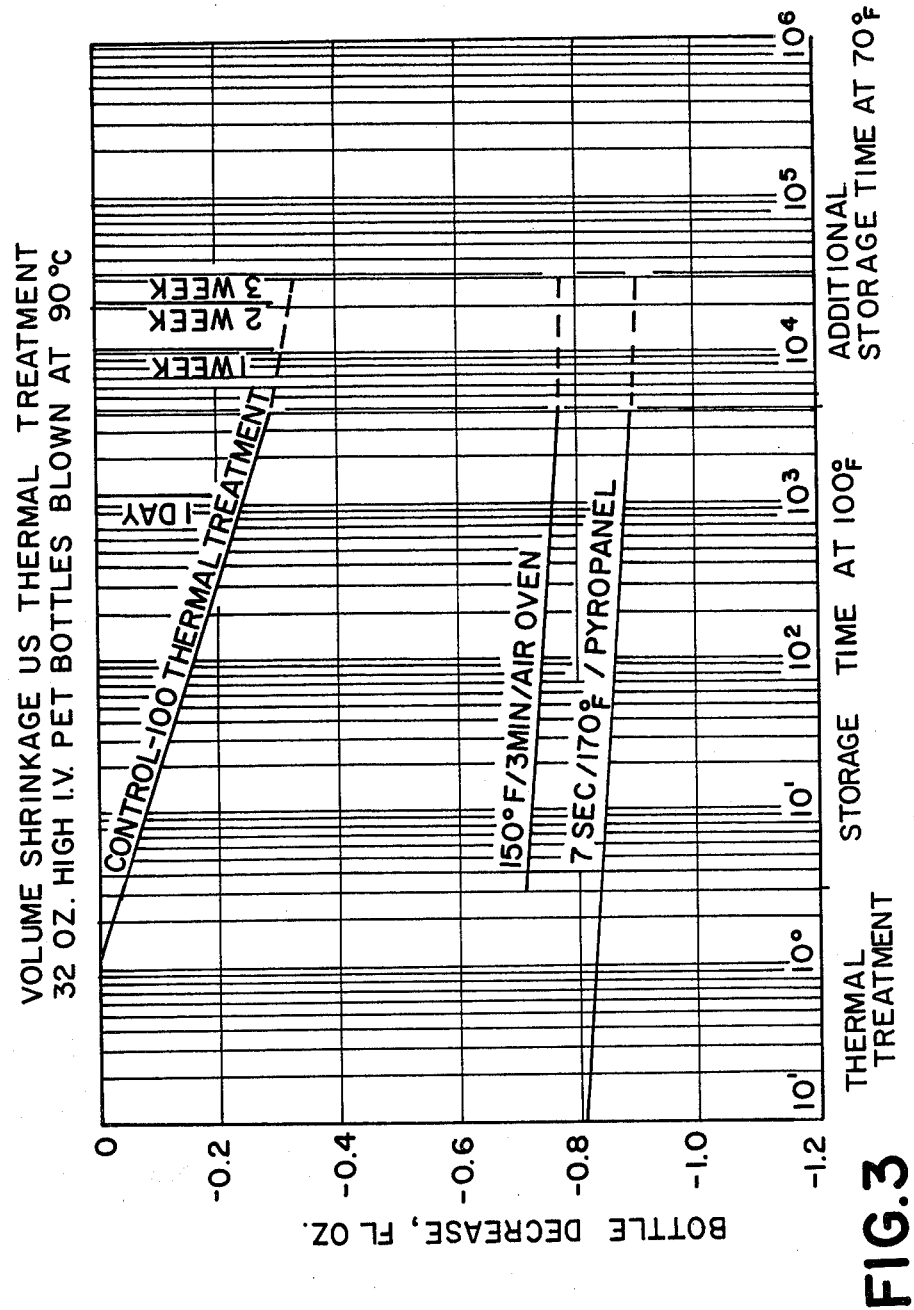
FIG. 3 compares the subsequent volume shrinkage vs. various thermal treatments in convective air at 150°

A series of 32 oz. oriented PET bottles for carbonated beverage with a wall thickness of about 15–20 mils were studied to provide the data for FIGS. 1 through 3.

The rate of shrinkage, of course, changes with blowing conditions, but does not vary significantly with i.v.

Of the three blow molding conditions (blow temperature, mold temperature, and stem temperature), blow temperature has the greatest effect on shrinkage rate. Blow temperature changes both the initial bottle volume and the rate of shrinkage. A variation of 10° C. on blow temperature can cause initial volume to vary by 0.1 fl. oz. Additionally, lower blow temperatures cause the rate of shrinkage to increase, and after a month (even at room temperature) that same 10° C. difference in blow temperature can mean a 0.2 fl. oz. difference in volume. Storage at 100° F. for a month can mean a difference of 0.3 fl.oz. for the same 10° C. difference in blow temperature. (Refer to FIG. 1.)

The effect of exposure temperatures is also shown. Time-temperature superposition applied to the shrinkage data generated at 70° F., 100° F., and 120° F. results in the master shrinkage curves of FIG. 3, which shows how bottles blown at both 90° C. and 100° F. will shrink at either 70° F., 100° F., 120° F., or 140° F. Clearly, high exposure temperatures can amplify the shrinkage problem.

The heat treatment of the blown container can be accomplished by any conventional heating means such as by hot air convection, infrared or dielectric.

Heating the 32 oz. containers by convective air heating was done as shown in FIG. 1. The thermal treatment preferably should produce an initial volume change of greater than 0.5 fl. oz. in order to minimize any subsequent shrinkage at 70° F.–100° F. FIG. 1 indicates that temperatures greater than 140° F. and times greater than one minute will produce volume changes of this magnitude if convective air heating is used. Volume changes greater than 0.8 fl. oz. begin to produce noticeable shape changes in the 1 liter bottle.

Accordingly, 32 oz. oriented PET bottles blown under usual conditions (90° C.) were exposed to either 140° F. or 150° F. for times of 1, 3, 5, and 7 minutes. Volume decrease was measured for each sample. Only the 5 and 7 minute samples at 150° F. showed objectionable distortion. All the samples were then allowed to shrink at room temperature for a period of 7–9 days. The thermal treatment at either 140° F. or 150° F. reduces the rate of shrinkage. Comparing the control samples to both the 140° F. and 150° F. samples shows that both time and temperature of exposure affect the subsequent shrinkage rate. However, temperature is most significant, with samples treated at 150° F. outperforming the samples treated at 140° F., regardless of treatment time.

Since the samples exposed to 150° F. for 3 minutes exhibited initial shrinkage of greater than 0.6 fl. oz. with no objectionable distortion, and since the subsequent rate of room temperature shrinkage was quite low, this heating step is a preferred step for a heat treatment according to the present invention.

Heating the container by a rapid heat treatment using a quartz infrared pyropanel was found to be effective. An overall initial volume change equivalent to the 0.67 fl. oz. produced by the convective air heat treatment at 150° F. for 3 minutes was achieved by the infrared treatment.

It was found that a bottle heated to 170° F. for 6 seconds using the pyropanel decreased 0.8 fl. oz. in volume without causing objectionable distortion. This treatment also is a preferred heat treatment step.

Bottles were blown at 90° C. and then exposed to the two selected heat treatments:
1. 150° F., 3 minutes in a convective air oven.
2. 170° F., 6 seconds via pyropanel exposure.

A third control set was also made for comparison. FIG. 3 shows the shrinkage which occurred (1) upon heat treatment, as well as after subsequent exposure, (2) first to 100° F. for 3 days and then (3) 2½ additional weeks at room temperature.

The data shows that heat treatment can reduce the shrinkage rate at both 100° F. and at room temperature to an acceptable magnitude. (Compare the control set with the heat treated sets in FIG. 3.)

What is claimed is:

1. A method for reducing post-molding shrinkage in storage at room temperature of a hollow oriented polyethylene terephthalate container; the method providing the steps of:
   (1) bringing a polyethylene terephthalate parison to orientation temperature,
   (2) blow molding the parison to provide a biaxially oriented container with larger dimensions than desired in the final container,
   (3) heating the blow molded container at about 140° F. to 170° F. for about 10 minutes to seven seconds to shrink the container to the desired size whereby at least about 95% of the total time-temperature dependent shrinkage which would subsequently occur at about room temperature for a time up to about 100,000 hours is accomplished without substantial distortion of the container, the lower temperature in step (3) requiring the longer time and the higher temperature requiring the shorter time, the heating being done without restraining the container and without cyrstallizing the polyethylene terephthalate container to stabilize the same against shrinkage.

2. A method as defined in claim 1 in which step (3) is conducted at about 150° F. for about 3 minutes.

3. A method as defined in claim 1 in which step (3) is conducted at about 170° F. for about 6 seconds.

4. A method as defined in claim 1 in which step (3) shrinks the container at least about 98% of the time-temperature dependent shrinkage so that only an insignificant amount of shrinkage will occur after extended storage under normal use conditions.

5. A method as defined in claim 1 in which the container of step (2) is made at least about 2% larger in volume than desired in the final container.

* * * * *